Jan. 30, 1968  E. H. CUMMINGS  3,365,924
TAPER THREADING IMPLEMENT
Filed Oct. 22, 1965  2 Sheets-Sheet 1
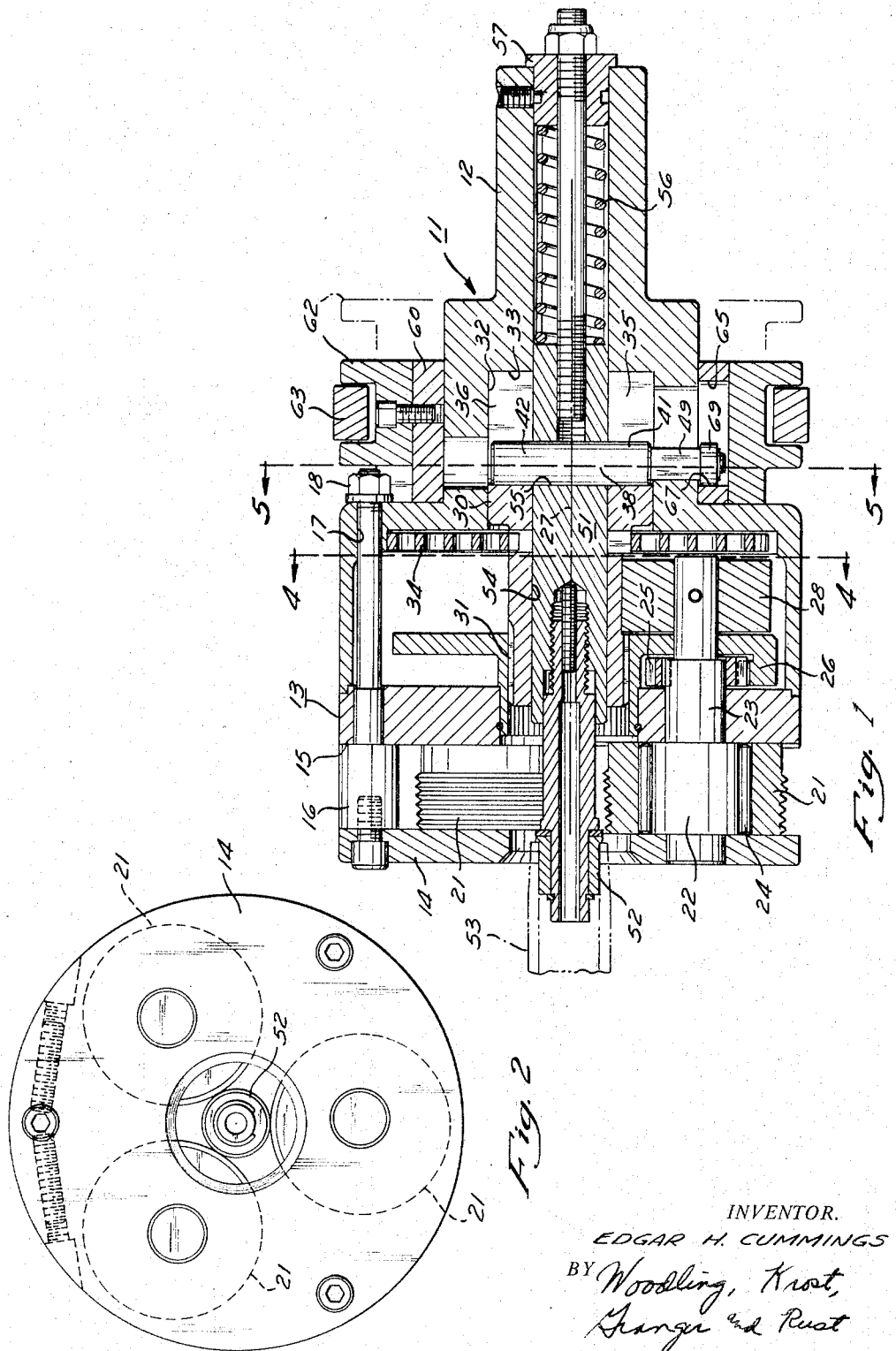
INVENTOR.
EDGAR H. CUMMINGS
BY Woodling, Krost,
Granger and Rust
ATTORNEYS INVENTOR.
EDGAR H. CUMMINGS
BY Woodling, Krost,
Granger and Rust
ATTORNEYS United States Patent Office 3,365,924
Patented Jan. 30, 1968

3,365,924
TAPER THREADING IMPLEMENT
Edgar H. Cummings, Cleveland, Ohio, assignor to The National Acme Company, a corporation of Ohio
Filed Oct. 22, 1965, Ser. No. 500,985
14 Claims. (Cl. 72—100)

The invention relates in general to threading implements and more particularly to threading implements to produce a taper thread on a workpiece.

Threading implements have previously been produced which may cut or roll a thread on a workpiece. In some rotational types of threading implements for use with a non-rotating workpiece, the threading members, such as chasers or thread rolls, are mounted on a frame which has limited rotational movement relative to the main body of the threading implement. This limited rotational movement is used to establish an opening movement of the threading members so that the threading members are disengaged from a workpiece. The striking together of parts at the end of such limited rotational movement has been found to be self-destructive at higher rotational speeds because of the centrifugal force on the threading chasers or rolls and this has limited the speeds at which the threading implement may be used. Other threading implements have incorporated a mechanism wherein the threading members are mounted on a front end frame which is fixedly attached to the main body of the threading implement to always rotate directly therewith. The threading members are mounted for movement toward and away from the axis of the threading movement such as being eccentrically mounted so as to establish an opening movement to disengage the threading members from the workpiece. This opening movement is governed by a clutch having a limited rotational movement. However, again centrifugal force acts on the eccentrically mounted threading members tending to force them outwardly and inhibiting their return inwardly to a position which will engage the workpiece. Also this again limits the maximum rotatonal speed at which the threading implement may be used. In both cases the centrifugal force increases the force which causes self-destruction of the threading implements and thus the life of such threading implements is limited.

In other threading implements means to establish a taper thread on a workpiece has been achieved by such threading implements having threading members which were large in inertia mass and being eccentrically mounted provided a large centrifugal force limiting the speed and this same centrifugal force contributed to the self-destruction of the threading implement.

Accordingly an object of the invention is to obviate the above mentioned disadvantages.

The invention may be incorporated in a threading implement having a body with an axis, a plurality of threading members mounted on the body for engagement with a workpiece, drive means rotatable with respect to the body in one direction to move the threading members to a released position for disengaging the workpiece and rotatable in the opposite direction to move the threading members to an engaged position for engagement with the workpiece, the improvement which comprises an operating mechanism for the drive means including: clutch means coupled to said drive means, said clutch means including a taper cam surface tapering redative to said axis and having first and second ends, a portion of said clutch means acting as a cam follower and positioned to coact with said taper cam surface, means urging said drive means in said one rotational direction relative to the said clutch means being mounted for limited rotation relative to said body and in one rotational position being locked against rotation in said one rotational direction under the urging of said urging means by engagement of said cam follower with said taper cam surface at said first end thereof; means to relatively longitudinally move said cam follower and said taper cam surface from said first to said second end thereof to move the threading members relative to said axis to form a taper thread on a workpiece, and then at said second end of said taper cam surface to rotate the drive means relative to the body in said one rotational direction by said urging means to disengage the threading members from the workpiece.

Another object of the invention is to provide a threading implement for rotation at high speed.

Another object of the invention is to provide a threading implement with counterbalance means to limit the force caused by centrifugal force.

Another object of the invention is to provide a threading implement with clutch means and counterbalance means to limit the torque caused by centrifugal force so as to effect easy opening and closing of the threading implement.

Another object of the invention is to provide a threading implement having a taper cam combined with a clutch so as to provide forming a taper thread on a workpiece and then disengagement of the clutch effecting opening of the threading implement.

Another object of the invention is to provide a threading implement with counterweight means to reduce the closing pressure required to reset the threading implement into threading position.

Other objects and a fuller understanding of the invention may be had by referring to the following description and claims, taken in conjunction with the accompanying drawings, in which:

FIGURE 1 is a longitudinal sectional view of a threading implement embodying the invention;

FIGURE 2 is a front view of the threading implement;

Figure 3:
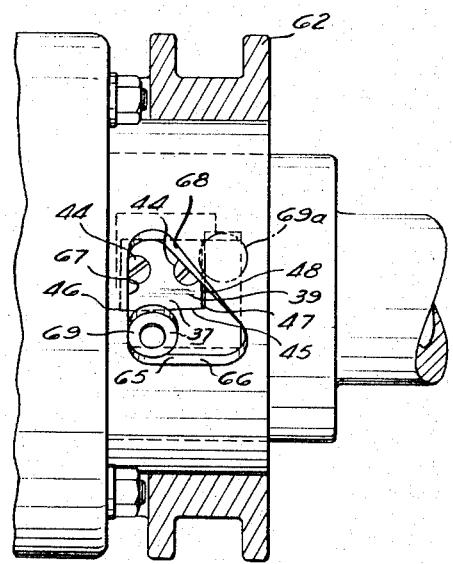
FIGURE 3 is a partial plan view of the threading implement with parts broken away.

The figures of the drawing show a preferred embodiment of the invention and the illustration of the threading implement 11 shown is by way of illustration of the invention and not limitation. The threading implement 11 includes a body which may include generally a shank 12 and a front end frame 13. The shank 12 may be of reduced outer diameter to be gripped and rotated in a chuck or the like of a machine tool. The front end frame 13 includes a front plate 14 and a rear plate 15 fastened together by spacer bolts 16 and fastened to the shank 12. The spacer bolts 16 pass through slots 17 in the front of the shank 12 and tightened by nuts 18. The purpose of the slot 17 is to permit adjustment of the size of thread being formed by the threading implement 11.

Figure 4:
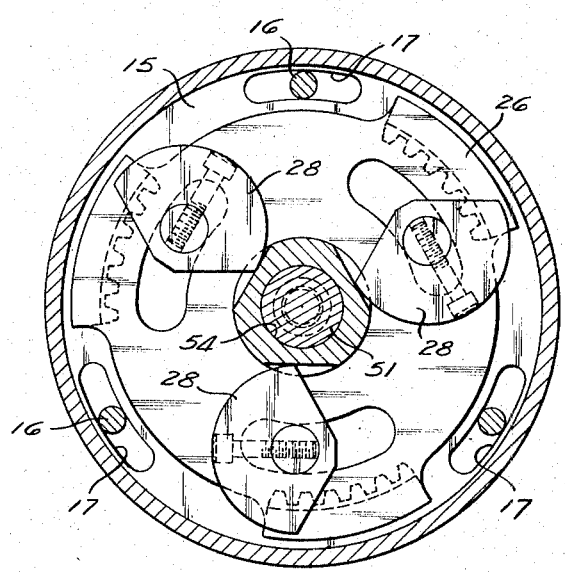
FIGURE 4 is a sectional view on line 4—4 of FIGURE 1.
Figure 5:
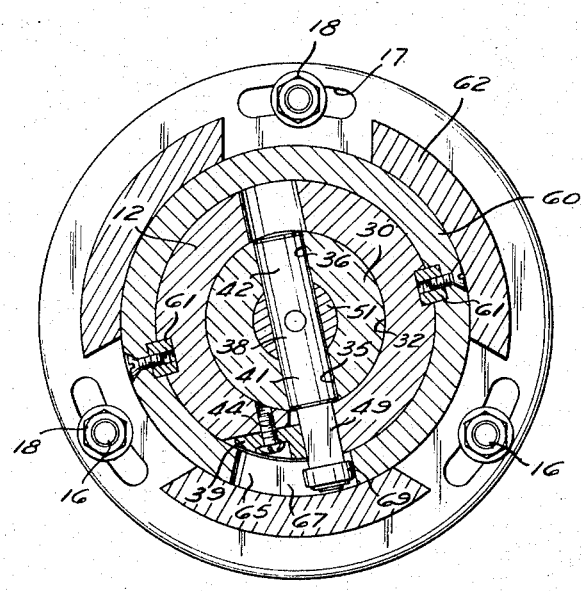
FIGURE 5 is a sectional view on line 5—5 of FIGURE 1.

Threading members 21 are provided on the front end frame 12 and these are shown as thread rolling rolls 21. These rolls are closely received between the front and rear plates 14 and 15. A plurality of such rolls are provided in this case shown as three in number. The rolls are journalled on an eccentric portion 22 of shafts 23 which are journalled in the front end frame 13. Needle bearings 24 may be provided between the eccentrics 22 and the respective thread rolls 21. A pinion 25 is fixed on each shaft 23 and meshes with a center gear or a large internal ring gear 26. This ring gear 26 may be interrupted as illustrated in FIGURE 4 in order to permit the aforesaid adjustment and to provide space for the bolts 16. The ring gear 26 is journalled for limited rotational movement on the front end frame 13, and is rotatable about the axis 27 of the threading implement 11. The ring gear 26 may be termed a drive gear or drive means to control the position of the thread rolls 21 by changing the position of the eccentrics 22 relative to the axis 27.

Counterweights 28 are fixed on the rear of each shaft 22 and substantially counterbalance the eccentrically mounted thread rolls 21. This is accomplished by having the mass of roll 21 and the eccentric 22 on which it is journalled multiplied by the distance between the axis of the eccentrics 22 and the axis of the shaft 23 be equal or substantially equal to the mass of the counterweight 28 multiplied by the distance between the axis of the shaft 23 and the center of gravity of the counterweight 28.

A drive bushing 30 is splined at 31 on the inside of the ring gear 26 and the rear of the drive bushing 30 is received in a counterbore 32 in the shank 12. This counterbore 32 has a forwardly facing end wall 33 which closely abuts the end of the drive bushing 30.

A first spring 34 is a torsion spring acting between the drive bushing 30 and the shank 12. The spring 34 is stressed to rotate the drive bushing counterclockwise relative to the shank 12, as viewed in FIGURE 2.

The drive bushing 30 has a pair of diametrically opposed circumferentially narrow slots 35 and 36 therein which are open at the forwardly facing end wall 33. Clutch means 37 is provided in the threading implement 11 and this clutch means 37 includes generally a crosspin 38 and a taper cam 39. The crosspin 38 has first and second radial end projections 41 and 42 disposed in the slots 35 and 36, respectively. These radial end projections are snugly confined in the drive bushing slots in a circumferential direction for rotation of the crosspin 38 in unison with the drive bushing 30. The radial end projections 41 and 42 are free to move longitudinally within the respective slot in the drive bushing 30. These radial end projections may be square in cross section for a larger bearing surface at the slots of the drive bushing 30.

The taper cam 39 is fixed to the shank 12 by screws 44. This permits ready removal of the taper cam 39 in order to change to one of a different angle or contour. The taper cam 39 has a taper cam surface 45 with first and second ends 46 and 47 and this surface 45 extends at a slight angle relative to the axis 27. The second end 47 of the cam surface 45 terminates at a rearwardly facing surface 48. This surface 48 may also be called a circumferentially extending surface which is substantially normal to the axis 27. The crosspin 38 has a square cross section portion 49 acting as a cam follower on the first radial end projection 41. This cam follower 49 cooperates with the taper cam 39 at both of the surfaces 45 and 48.

A mandrel or inside trip sleeve 51 has a forward extension 52 to receive and act as a mandrel for a workpiece 53. This mandrel portion 52 guides the workpiece 53 into position between the thread rolls 21. The mandrel 51 is slidable within a bore 54 in the drive bushing 30 and a crossbore 55 in the mandrel 51 received the crosspin 38. A compression spring 56 is a second spring engaging the rear of the mandrel 51 and engages a plug 57 fastened in the rear of the shank 12. This second spring 56 urges the crosspin 38 forward so that the cam follower 49 is urged toward the front or first end 46 of the taper cam surface 45.

An annular cam member 60 is an operating member to reset the clutch means 37. This cam member 60 is a sleeve surrounding a cylindrical portion on the shank 12. It is restrained by a key 61 against relative rotation with the shank 12. An operating spool 62 is fixed on the outside of the cam member 60 and this operating spool 62 may be longitudinally moved by a yoke 63. This yoke 63 may be non-rotative but longitudinally movable by hand or other mechanism in order to reset the threading implement 11 to an engaged position to thread a workpiece.

The cam member 60 has a generally triangular slot 65 therein which is defined by longitudinally extending edge 66, a circumferentially extending edge 67 and a circumferentially and longitudinally inclined edge 68. The edges 66 and 67 are substantially perpendicular and the inclined edge extends between the opposite ends of the two edges 66 and 67. A cam follower roller 69 in carried on the first radial end projection 41 of the crosspin 38 and co-operates with the edges of the cam slot 65.

OPERATION

The FIGURES 1, 2, and 3 show the threading implement in the reset position or engaged position ready to thread a workpiece 53. The thread rolls 21 are mounted on the eccentrics 22 and the eccentrics are so positioned as to position the thread rolls 21 with a minimum space therebetween to engage the workpiece 53. The thread rolls 21 may have a spiral thread thereon for roll forming a thread on a workpiece, or the rolls 21 may have annular grooves thereon if the axes of the shafts 23 are skewed relative to the axis 27. In either case a thread will be formed on the workpiece 53. The threading implement 11 may be rotated or kept relatively stationary and this implement may be longitudinally moved or may be longitudinally stationary. The requirement is that there be relative rotary movement between the workpiece 53 and the threading implement 11 and that there be relative longitudinal movement therebetween. Accordingly this gives four different possible modes of operation. As one mode of operation, it will be assumed that the threading implement 11 is rotated and the workpiece 53 is fed longitudinally into this threading implement 11. As the workpiece 53 is moved longitudinally the mandrel portion 52 which it engages will be moved rearwardly and further compresses the second spring 56. Also during this retraction the drive bushing 30 and crosspin 38 are retracted. It is assumed that the threading implement 11 is rolling a right hand thread, namely it is rotated counterclockwise as viewed in the front view of FIGURE 2. Under these conditions the cam follower 49 retracts along the taper cam surface 45 toward the second end 47. Because of the slight taper on this cam surface 45, the crosspin 38, drive bushing 30, and drive gear 26 rotate slightly counterclockwise, in FIGURE 2, relative to the shank 12 and front end frame 13. This causes a slight counterclockwise rotation to the pinions 25 and to the eccentrics 22 to move the thread rolls 21 slightly outwardly. This establishes a taper thread on the workpiece 53 such as the usual pipe thread.

At the corner 47, the cam follower 49 falls off the taper cam surface 45 and coacts with the rearwardly facing surface 48. The stress in the first spring 34 and pressure of work rotates the drive gear 26 counterclockwise, in FIGURE 2 to rapidly open the thread rolls 21 to disengage them from the workpiece 53. This is the opening action so that the thread rolls 21 and the entire threading implement 11 is disengaged from the workpiece 53. This may be set to occur at the end of the desired taper thread forming. With this opening action it is not necessary to reverse the rotation of the threading implement 11 in order to back the threading implement off the workpiece 53. The workpiece 53 may merely be longitudinally removed from the threading implement 11 while the implement continues its normal rotation. The action of the cam follower 49 falling off the corner 47 is a disengagement of the clutch means 37 so that the opening action of the head or implement 11 may occur. It will be observed that the mandrel portion 52 is screwed into the main mandrel 51 and this is for the purpose of adjustment to adjust the position at which the clutch means 37 becomes disengaged to thus terminate the threading action.

The clutch means 37 must resist three different forces during the thread forming operation. The first is the centrifugal force acting on the eccentrically mounted thread rolls 21, the second is the rotational force of the first spring 34 and the third is the pressure exerted by the attempted deformation of the workpiece between thread rolls acting through the eccentrics 22. At high rotational speeds and with large diameter threading implements and large diameter workpieces, the centrifugal force may be as much as 1,000 pounds or more. In the past this has been a very large force which has limited the rotational speeds at which the prior art threading implements may be used. Accordingly the counterweights 28 have been found extremely helpful in counterbalancing all or most of the centrifugal force acting on such thread rolls. Accordingly the force acting between the cam follower 49 and the taper cam surface 45 is much reduced, giving an easier opening threading implement 11.

The counterweights 28 are of even greater value in making an easier closing or resettable threading implement 11. It will be observed that in order to reset the head or implement 11 it is necessary to move the cam follower roller 69 from the dotted line position 69A shown in FIGURE 3 to the solid line position shown in this figure. Accordingly the crosspin 38, drive bushing 30, and drive gear 26 must be rotated clockwise through a limited angle relative to the shank 12, as viewed in FIGURE 2. This direction will move the thread rolls 21 inwardly toward the axis 27 which is opposite to the direction of the centrifugal force on the rolls 21. Accordingly without the counterweights 28 it would be necessary to overcome this large centrifugal force which has in the past severely limited the rotational speed of threading implements.

The operating cam member 60 may be used to reset the implement 11. The triangular cam slot 65 and more particularly the inclined edge thereon acts on the cam follower roller 69 as the cam member 60 is moved longitudinally to the left in FIGURE 3. This will move the cam follower roller 69 downwardly as viewed in FIGURE 3 or clockwise as viewed in FIGURE 2 until the cam follower 49 registers with the taper cam surface 45, whereupon the second spring 56 will move the crosspin 38 forwardly along the taper cam surface 45. This will reset the threading implement 11 by locking the cross-pin 38, drive bushing 30, and drive gear 26 against rotation in the counterclockwise direction (FIGURE 2) relative to the shank 12.

If the mandrel 51 is not used the threading implement 11 may be tripped open by manual operation of the yoke 63 or by some mechanical actuation thereon. The first spring 34 is stressed to rotate the drive gear 26 in one rotational direction, namely counterclockwise in FIGURE 2, relative to the shank 12. The inclined edge 68, when moved to the left in FIGURE 3, may be the operating means to rotate the drive gear 26 in the opposite rotational direction to reset the threading implement 11.

The taper cam surface 45 may be a straight line taper or may have a variable contour thereon to form a corresponding taper or contour on the workpiece 53.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts or steps may be resorted to without departing from the spirit and the scope of the invention as hereinafter claimed.

What is claimed is:

1. In a threading implement having a body with an axis, a plurality of threading members mounted on the body for engagement with a workpiece, drive means rotatable with respect to the body in one direction to move the threading members to a released position for disengaging the workpiece and rotatable in the opposite direction to move the threading members to an engaged position for engagement with the workpiece, the improvement which comprises an operating mechanism for the drive means including:

clutch means coupled to said drive means, said clutch means including a taper cam surface tapering relative to said axis and having first and second ends, a portion of said clutch means acting as a cam follower and positioned to coact with said taper cam surface, means urging said drive means in said one rotational direction relative to the said clutch means being mounted for limited rotation relative to said body and in one rotational position being locked against rotation in said one rotational direction under the urging of said urging means by engagement of said cam follower with said taper cam surface at said first end thereof:

means to relatively longitudinally move said cam follower and said taper cam surface from said first to said second end thereof to move the threading members relative to said axis to form a taper thread on a workpiece, and then at said second end of said taper cam surface to rotate the drive means relative to the body in said one rotational direction by said urging means to disengage the threading members from the workpiece.

2. In a threading implement having a body with an axis, a plurality of threading members mounted on the body for engagement with a workpiece, drive means rotatable with respect to the body in one direction to move the threading members to a released position for disengaging the workpiece and rotatable in the opposite direction to move the threading members to a reset or engaged position for engagement with the workpiece, the improvement which comprises an operating mechanism for the drive means including:

counterweights acting on the mounting of the threading members to substantially counterbalance the same for centrifugal force acting on the threading members;

clutch means coupled to said drive means to rotate in unison with said drive means, said clutch means including a locking surface having first and second ends, a portion of said clutch means acting as a cam follower and positioned to coact with said locking surface, means urging said drive means in said one rotational direction relative to the body, said clutch means being mounted for limited rotation relative to said body and in one rotational position being locked against rotation in said one rotational direction under the urging of said urging means by engagement of said cam follower with said locking surface at said first end;

means to cause relative longitudinal movement of said cam follower and said locking surface from said first to said second end thereof and then said second end to permit said urging means to disengage said clutch means to immediately rotate the drive means relative to the body in said one rotational direction to rapidly disengage the threading members from the workpiece.

3. In a threading implement having a body with an axis, a plurality of threading members mounted on the body for engagement with a workpiece, drive means rotatable with respect to the body in one direction to move the threading members to a released position for disengaging the workpiece and rotatable in the opposite direction to move the threading members to a reset or engaged position for engagement with the workpiece, the improvement which comprises an operating mechanism for the drive means including:

counterweights acting on the mounting of the threading members to substantially counterbalance the same for centrifugal force acting on the threading members;

clutch means coupled to said drive means to rotate in unison with said drive means, said clutch means including a taper cam surface tapering relative to said axis and having first and second ends, a portion of said clutch means acting as a cam follower and positioned to coact with said taper cam surface, means urging said drive means in said one rotational direction relative to the body, said clutch means being mounted for limited rotation relative to said body and in one rotational position being locked against rotation in said one rotational direction under the urging of said urging means by engagement of said cam follower with said taper cam surface at said first end;

means to cause relative longitudinal movement of said cam follower and said taper cam surface from said first to said second end thereof to gradually move the threading members relative to said axis to form a taper thread on a workpiece, and then at said second end of said taper cam surface to permit said urging means to disengage said clutch means to immediately rotate the drive means relative to the body in said one rotational direction to rapidly disengage the threading members from the workpiece;

and operating means movable longitudinally in the opposite direction to move said clutch cam follower means in the opposite rotational direction against the urging of said urging means until said cam follower registers with said taper cam surface at said first end thereof to reset the threading members by locking the drive means against rotation relative to the body.

4. In a threading implement having a body with an axis, a plurality of threading members mounted on the body for engagement with a workpiece, drive means rotatable with respect to the body in one direction to move the threading members to a released position for disengaging the workpiece and rotatable in the opposite direction to move the threading members to a reset or engaged position for engagement with the workpiece, the improvement which comprises an operating mechanism for the drive means including:

clutch means coupled to said drive means to rotate in unison with said drive means, said clutch means including a taper cam surface tapering relative to said axis and having first and second ends, a portion of said clutch means acting as a cam follower and positioned to coact with said taper cam surface, means urging said drive means in said one rotational direction relative to the body, said clutch means being mounted for limited rotation relative to said body and in one rotational position being locked against rotation in said one rotational direction under the urging of said urging means by engagement of said clutch means portion with said taper cam surface at said first end;

an operating member relatively longitudinally movable of the body to stress the urging means to cause relative longitudinal movement of said clutch means portion and said taper cam surface from said first to said second end thereof to gradually move the threading members relative to said axis to form a taper thread on a workpiece, and then at said second end of said taper cam surface to permit said urging means to disengage said clutch means to immediately rotate the drive means relative to the body in said one rotational direction to rapidly disengage the threading members from the workpiece;

and said operating means, when relatively moved longitudinally in the opposite direction against the rotational urging of the urging means moving said clutch means portion in the opposite rotational direction until said clutch means portion registers with said taper cam surface, whereupon the urging means relatively longitudinally moves said clutch means portion and said taper cam surface to said first end thereof to reset the threading members by locking the drive means against rotation relative to the body.

5. In a threading implement having a body with an axis, a plurality of threading members mounted on the body for engagement with a workpiece, drive means rotatable with respect to the body in one direction to move the threading members to a released position for disengaging the workpiece and rotatable in the opposite direction to move the threading members to a reset or engaged position for engagement with the workpiece, and spring means urging said drive means in said one rotational direction relative to the body, the improvement which comprises an operating mechanism for the drive means including:

clutch means coupled to said drive means to rotate in unison with said drive means, said clutch means including a taper cam surface tapering relative to said axis and terminating at a circumferentially extending surface, a portion of said clutch means acting as a cam follower and positioned to coact with said two surfaces, said clutch means being mounted for limited rotation relative to said body and in one rotational position being locked against rotation in said one rotational direction under the urging of the spring means by engagement of said clutch means portion with said taper cam surface at a relative position thereof remote from said circumferentially extending surface;

an operating member relatively longitudinally movable of the body in accordance with relative longitudinal movement of the threading implement and a workpiece threaded by the threading members to stress the spring means to cause relative longitudinal movement of said clutch means portion and said taper cam surface to gradually move the threading members relative to said axis to form a taper thread on a workpiece, and then at said circumferentially extending surface to permit the spring means to disengage said clutch means to immediately rotate the drive means relative to the body in said one rotational direction, said clutch means portion riding across said circumferentially extending surface to rapidly disengage the threading members from the workpiece;

and said operating means, when relatively moved longitudinally in the opposite direction against the rotational urging of the spring means moving said clutch means portion in the opposite rotational direction until said clutch means portion registers with said taper cam surface, whereupon the spring means relatively longitudinally moves said clutch means portion and said taper cam surface to said remote position to reset the threading members by locking the drive means against rotation relative to the body.

6. In a threading implement having a body with an axis a plurality of threading members mounted on the body for engagement with a workpiece, drive means rotatable with respect to the body in one direction to cause the threading members to move to a released position for disengaging the workpiece and rotatable in the opposite direction to cause the threading members to move spring means urging said drive means in said one rotational direction relative to the body, the improvement which comprises an operating mechanism for the drive means including:

a projection transverse to said axis and connected to rotate in unison with said drive means;

a taper cam surface tapering relative to said axis and terminating at a circumferentially extending surface, said transverse projection acting as a cam follower for engagement with said taper cam surface and said circumferentially extending surface, and the spring means relatively longitudinally biasing said transverse projection and said taper cam surface to a relative position of said transverse projection remote from said circumferentially extending surface to lock the drive means against rotation with respect to the body;

means moved in accordance with relative longitudinal movement of the threading implement and the threading members to stress the spring means to cause relative longitudinal movement of said transverse projection and said taper cam surface to gradually move the threading members relative to said axis to form a taper thread on a workpiece, and then at said circumferentially extending surface to permit the spring means to immediately rotate the drive means relative to the body in said one rotational direction, said transverse projection riding across said circumferentially extending surface to rapidly disengage the threading members from the workpiece;

and means to turn the drive means in the opposite rotational direction against the urging of the spring means until said transverse projection registers with said taper cam surface, whereupon the spring means relatively longitudinally moves said transverse projection and said taper cam surface to said remote position to reset the threading members by locking the drive means against rotation relative to the body.

7. In a threading implement having a body with an axis, a plurality of shafts journalled on the body and having eccentrics, a plurality of threading members carried on the eccentrics for engagement with a workpiece, drive means rotatable with respect to the body in one direction to rotate the shafts to cause the threading members to move outwardly on said eccentrics to a released position for disengaging the workpiece and rotatable in the opposite direction to cause the threading members to move inwardly on said eccentrics to a reset or engaged position for engagement with the workpiece, and first spring means urging said drive means in said one rotational direction relative to the body, the improvement which comprises an operating mechanism for the drive means including:

counterweights on the shafts substantially counterbalancing the eccentrically mounted threading members;

a projection transverse to said axis and connected to rotate in unison with the drive means;

a taper cam having cam surface tapering slightly relative to said axis and terminating at a circumferentially extending surface substantially normal to said axis, said transverse projection acting as a cam follower for engagement with said taper cam and said circumferentially extending surface, and second spring means relatively longitudinally biasing said transverse projection and said taper cam to a relative position of said transverse projection remote from said circumferentially extending surface to lock the drive means against rotation with respect to the body under the urging of the first spring means;

means moved in accordance with relative longitudinal movement of the threading implement and a workpiece threaded by the threading members to stress said second spring means to cause relative longitudinal movement of said transverse projection and said taper cam along said taper cam surface to gradually open the threading members to form a taper thread on a workpiece, and then at said circumferentially extending surface to permit first spring menas to immediately rotate the drive means relative to the body in said one rotational direction, said transverse projection riding across said circumferentially extending surface to disengage the threading members from the workpiece;

and means to turn the drive means in the opposite rotational direction against the urging of the first spring means until said transverse projection registers with said taper cam surface, whereupon said second spring means relatively longitudinally moves said transverse projection and said taper cam along said taper cam surface to said remote position to reset the threading members by locking the drive means against rotation relative to the body.

8. In a threading implement having a body with an axis and with a counterbore therein, a plurality of shafts journalled on the body and having eccentrics, a plurality of thread rolling rolls journalled on the eccentrics for engagement with a workpiece, drive means rotatable with respect to the body in one direction to rotate the shafts to cause the thread rolling rolls to move outwardly on said eccentrics to a released position for disengaging the workpiece and rotatable in the opposite direction to cause the thread rolling rolls to move inwardly on said eccentrics to a reset or engaged position for engagement with the workpiece, and first spring means urging said drive means in said one rotational direction relative to the body, the improvement which comprises an operating mechanism for the drive means including:

counterweights on the shafts substantially counterbalancing the eccentrically mounted thread rolls;

a crosspin having a projection transverse to said axis and connected to rotate in unison with the drive means;

a taper cam having a cam surface tapering slightly relative to said axis and terminating at a circumferentially extending surface substantially normal to said axis, said transverse projection of said crosspin acting as a cam follower for engagement with said taper cam and said circumferentially extending surface, and second spring means relatively longitudinally biasing said crosspin projection and said taper cam to a relative position of said transverse projection remote from said circumferentially extending surface to lock the drive means against rotation with respect to the body under the urging of the first spring means;

a mandrel in said counterbore adapted to be pushed rearwardly by a workpiece threaded by the rolls and stressing said second spring means to cause relative longitudinal movement of said crosspin projection and said taper cam along said taper cam surface to gradually open the thread rolls to roll a taper thread on a workpiece, and then at said circumferentially extending surface to permit the first spring means to immediately rotate the drive means relative to the body in said one rotational direction, said crosspin projection riding across said circumferentially extending surface to disengage said threading implement from the workpiece;

and means to turn the drive means in the opposite rotational direction against the urging of the first spring means until said transverse projection of the crosspin registers with said taper cam surface, whereupon said second spring means relatively longitudinally moves said crosspin projection and said taper cam along said taper cam surface to said remote position to reset said threading implement by locking the drive means against rotation relative to the body.

9. In a threading implement having a body with a counterbore therein, a plurality of shafts journalled on the body and having eccentrics, a plurality of thread rolling rolls journalled on the eccentrics for engagement with a workpiece, drive means rotatable with respect to the body in one direction to rotate the shafts to cause the thread rolling rolls to move outwardly on said eccentrics to a released position for disengaging the workpiece and rotatable in the opposite direction to cause the thread rolling rolls to move inwardly on said eccentrics to a reset or engaged position for engagement with the workpiece, and first spring means urging said drive means in said one rotational direction relative to the body, the improvement which comprises an operating mechanism for the drive means including:

a crosspin having a transverse projection and connected to rotate in unison with the drive means;

a taper cam having a cam surface tapering slightly relative to the axis of the threading implement and terminating at a circumferentially extending surface substantially normal to said axis, said transverse projection of said crosspin acting as a cam follower for engagement with said taper cam and said circumferentially extending surface, and second spring means relatively longitudinally biasing said transverse projection of said crosspin and said taper cam to a relative position of said transverse projection remote from said circumferentially extending surface to lock the drive means against rotation with respect to the body under the urging of the first spring means;

a cam member having an inclined cam slot and movable longitudinally relative to the body;

said transverse projection also acting as a cam follower engaged in said cam slot;

a mandrel in said counterbore adapted to be pushed rearwardly by a workpiece threaded by the rolls and stressing said second spring means to cause relative longitudinal movement of said crosspin projection and said taper cam along said taper cam surface to gradually open the thread rolls to roll a taper thread on a workpiece, and then at said circumferentially extending surface to permit the first spring means to immediately rotate the drive means relative to the body in said one rotational direction, said crosspin projection riding across said circumferentially extending surface to disengage said threading implement from the workpiece;

and said cam member, when moved longitudinally in one direction, moving said inclined cam slot over said transverse projection to turn the drive means in the opposite rotational direction against the urging of the first spring means until said transverse projection of the crosspin registers with said taper cam surface, whereupon said second spring means relatively longitudinally moves said transverse projection of the crosspin and said taper cam along said taper cam surface to said remote position to reset said threading implement by locking the drive means against rotation relative to the body.

10. In a threading implement having a body with a counterbore therein, a plurality of shafts journalled on the body and having eccentrics, a plurality of thread rolling rolls journalled on the eccentrics for engagement with a workpiece, a drive gear rotatable with respect to the body in one direction to rotate the shafts to cause the thread rolling rolls to move outwardly on said eccentrics to a released position for disengaging the workpiece and rotatable in the opposite direction to cause the thread rolling rolls to move inwardly on said eccentrics to a reset or engaged position for engagement with the workpiece, and first spring means urging said drive gear in said one rotational direction relative to the body, the improvement which comprises an operating mechanism for the drive gear including:

a crosspin having a transverse projection and connected to rotate in unison with the drive gear;

a taper cam having a cam surface tapering slightly relative to the axis of the threading implement and terminating at a circumferentially extending surface substantially normal to said axis, said transverse projection of said crosspin acting as a cam follower for engagement with said taper cam and said circumferentially extending surface, and second spring means relatively longitudinally biasing said transverse projection of said crosspin and said taper cam to a relative position whereat said crosspin projection is disposed remotely from said circumferentially extending surface to lock the drive gear againt rotation with respect to the body under the urging of the first spring means;

a cam member slidable longitudinally on the body, key means restraining said cam member and the body against relative rotation, said cam member having a cam slot therein with a circumferentially and longitudinally inclined edge;

said transverse projection also acting as a cam follower engaged in said cam slot;

a mandrel in said counterbore adapted to be pushed rearwardly by a workpiece threaded by the rolls and stressing said second spring means to cause relative longitudinal movement of said crosspin projection and said taper cam along said taper cam surface to gradually open the thread rolls to roll a taper thread on a workpiece, and then at said circumferentially extending surface to permit the first spring means to immediately rotate the drive gear relative to the body in said one rotational direction, said crosspin projection riding across circumferentially extending surface to disengage said threading implement from the workpiece;

and said cam member, when moved longitudinally in one direction, moving the inclined edge of the cam slot over said transverse projection to turn the drive gear in the opposite rotational direction against the urging of the first spring means until said transverse projection of the crosspin registers with said taper cam surface, whereupon said second spring means relatively longitudinally moves said transverse projection of the crosspin and said taper cam along said taper cam surface to said remote position to reset said threading implement by locking the drive gear against rotation relative to the body.

11. In a threading implement having a body with a counterbore therein, a plurality of shafts journalled on the body and having eccentrics, a plurality of thread rolling rolls journalled on the eccentrics for engagement with a workpiece, a drive gear rotatable with respect to the body in one direction to rotate the shafts to cause the thread rolling rolls to move outwardly on said eccentrics to a released position for disengaging the workpiece and rotatable in the opposite direction to cause the thread rolling rolls to move inwardly on said eccentrics to a reset or engaged position for engagement with the workpiece, and first spring means urging said drive gear in said one rotational direction relative to the body, the improvement which comprises an operating mechanism for the drive gear including:

counterweights on the shafts substantially counterbalancing the eccentrically mounted thread rolls;

a crosspin having a transverse projection and connected to rotate in unison with the drive gear and to have limited longitudinal movement with respect thereto;

a taper cam fixed on the body having a cam surface tapering slightly relative to the axis of the threading implement and terminating at a rearwardly facing surface substantially normal to said axis, said transverse projection of said crosspin acting as a cam follower for engagement with said taper cam and said rearwardly facing surface, and second spring means biasing said transverse projection of said crosspin forwardly to the front of said taper cam to lock the drive gear against rotation with respect to the body under the urging of the first spring means;

a cam member slidable longitudinally on the body, key means restraining said cam member and the body against relative rotation, said cam member having a cam slot therein with a circumferentially and longitudinally inclined edge;

said transverse projection also acting as a cam follower engaged in said cam slot;

a mandrel in said counterbore adapted to be pushed rearwardly by a workpiece threaded by the rolls and stressing said second spring means to cause said transverse projection of the crosspin to move rearwardly along said taper cam to gradually open the thread rolls to roll a taper thread on a workpiece, and then at said rearwardly facing surface to permit the first spring means to immediately rotate the drive gear relative to the body in said one rotatonal direction, said crosspin projection riding across said rearwardly facing surface to disengage said threading implement from the workpiece;

and said cam member, when moved longitudinally in one direction, moving the inclined edge of the cam slot over said transverse projection to turn the drive gear in the opposite rotational direction against the urging of the first spring means until said transverse projection of the crosspin registers with said taper cam surface, whereupon said second spring means forces said transverse projection of the crosspin forwardly along said taper cam surface to reset said threading implement by locking the drive gear against rotation relative to the body.

12. In a threading implement having a body with a counterbore therein, a plurality of shafts journalled on the body and having eccentrics, a plurality of thread rolling rolls journalled on the eccentrics for engagement with a workpiece, a drive gear rotatable with respect to the body in one direction to rotate the shafts to cause the thread rolling rolls to move outwardly on said eccentrics to a released position for disengaging the workpiece and rotatable in the opposite direction to cause the thread rolling rolls to move inwardly on said eccentrics to a reset or engaged position for engagement with the workpiece, and first spring means urging said drive gear in said one rotational direction relative to the body, the improvement which comprises an operating mechanism for said drive gear including:

a drive bushing rotatably mounted in said counterbore in the body and connected to rotate in unison with said drive gear;

a crosspin connected to rotate in unison with said drive bushing and to have limited longitudinal movement with respect thereto, a transverse projection on said crosspin;

a taper cam fixed on the body having a cam surface tapering slightly relative to the axis of the threading implement and terminating at a rearwardly facing surface substantially normal to said axis, said transverse projection of said crosspin acting as a cam follower for engagement with said taper cam and said rearwardly facing surface, and second spring means biasing said transverse projection of the crosspin forwardly to the front of said taper cam to lock said crosspin, said drive bushing and said drive gear against rotation with respect to the body under the urging of said first spring means;

a cam member slidable longitudinally on the body, key means restraining said cam member and the body against relative rotation, said cam member having a cam slot therein with a circumferentially and longitudinally inclined edge;

said transverse projection also acting as a cam follower engaged in said cam slot;

a mandrel in said counterbore adapted to be pushed rearwardly by a workpiece threaded by said rolls and stressing said second spring means to cause said transverse projection of the crosspin to move rearwardly along said taper cam to gradually open said thread rolls to roll a taper thread on a workpiece, and then at said rearwardly facing surface to permit said first spring means to immediately rotate said drive gear relative to the body in said one rotational direction, said crosspin riding across said rearwardly facing surface to disengage said threading implement from the workpiece;

and said cam member, when moved longitudinally in one direction, moving the inclined edge of the cam slot over said transverse projection to turn said drive gear in the opposite rotational direction against the urging of said first spring means until said transverse projection of the crosspin registers with said taper cam surface, whereupon said second spring means forces said transverse projection of the crosspin forwardly along said taper cam surface to reset said threading implement by locking said drive gear against rotation relative to the body.

13. In a threading implement having a shank with a counterbore therein terminating in a forwardly-facing end wall, a front end frame rigidly connected to the shank, a plurality of shafts journalled on the frame and having eccentrics, a plurality of thread rolling rolls journalled on the eccentrics for engagement with a workpiece, a drive gear rotatable with respect to the frame in one direction to rotate the shafts to cause the thread rolling rolls to move outwardly on said eccentrics to a released position for disengaging the workpiece and rotatable in the opposite direction to cause the thread rolling rolls to move inwardly on said eccentrics to a reset or engaged position for engagement with the workpiece, and first spring means urging said drive gear in said one rotational direction, the improvement which comprises an operating mechanism for said drive gear including:

a drive bushing rotatably mounted in said counterbore in the shank and connected to said drive gear for rotation in unison therewith, said drive bushing having a circumferentially narrow slot therein open at said end wall of the counterbore in the shank;

a crosspin having a radial end projection snugly confined in said drive bushing slot in a circumferential direction for rotation of the crosspin in unison with the drive bushing, said radial end projection being free to move longitudinally within said slot in the drive bushing;

a taper cam fixed on the shank having a cam surface tapering slightly relative to the axis of the threading implement and terminating at a rearwardly facing surface normal to said axis, said radial end projection of said crosspin acting as a cam follower for engagement with said taper cam and said rearwardly facing surface, and second spring means biasing said radial end projection of the crosspin forwardly to the front of said taper cam to lock said crosspin, said drive bushing and said drive gear against rotation with respect to the shank and the front end frame under the urging of said first spring means;

an annular cam member slidable longitudinally on the outside of the shank, key means restraining said cam member and the shank against relative rotation, said cam member having a cam slot therein with a circumferentially and longitudinally inclined edge;

a roller on said radial end projection of said crosspin engaged in said cam slot;

a mandrel in said counterbore adapted to be pushed rearwardly by a workpiece threaded by said rolls and compressing said second spring means to cause said radial end projection of the crosspin to move rearwardly along said taper cam to gradually open said thread rolls to roll a taper thread on a workpiece, and then at said rearwardly facing surface to permit said first spring means to immediately rotate said drive bushing, said crosspin and said drive gear in said one rotational direction, with said roller on said crosspin riding across said rearwardly facing surface to disengage said threading implement from the workpiece;

and said cam member, when moved longitudinally in one direction, moving the inclined edge of the cam slot over said roller to turn the crosspin, said drive bushing and said drive gear in the opposite rotational direction against the urging of said first spring means until said radial end projection of the crosspin registers with said taper cam surface, whereupon said second spring means forces said radial end projection of the crosspin forwardly along said taper cam surface to reset said threading implement by locking said crosspin, said drive bushing and said drive gear against rotation relative to the shank and the frame.

14. In a threading implement having a shank with a counterbore therein terminating in a forwardly-facing end wall, a front end frame rigidly connected to the shank, a plurality of shafts journalled on the frame and having eccentrics, a plurality of thread rolling rolls journalled on the eccentrics for engagement with a workpiece, a drive gear rotatable with respect to the frame in one direction to rotate the shafts to cause the thread rolling rolls to move outwardly on said eccentrics to a released position for disengaging the workpiece and rotatable in the opposite direction to cause the thread rolling rolls to move inwardly on said eccentrics to a reset or engaged position for engagement with the workpiece, and first spring means urging said drive gear in said one rotational direction, the improvement which comprises an operating mechanism for said drive gear including:

- counterweights on the shafts substantially counterbalancing said eccentrically mounted thread rolls;
- a drive bushing rotatably mounted in said counterbore in the shank and splined to said drive gear for rotation in unison therewith, said drive bushing having a pair of diametrically opposed, circumferentially narrow slots therein which are open at said end wall of the counterbore in the shank;
- a crosspin having first and second opposite radial end projections which are snugly confined in said drive bushing slots in a circumferential direction for rotation of the crosspin in unison with the drive bushing, said first and second radial end projections being free to move longitudinally within the respective slot in the drive bushing;
- a taper cam fixed on the shank having a cam surface tapering slightly relative to the axis of the threading implement and terminating at a rearwardly facing surface normal to said axis, said first radial end projection of said crosspin acting as a cam follower for engagement with said taper cam and said rearwardly facing surface, and second spring means biasing said first radial end projection of the crosspin forwardly to the front of said taper cam to lock said crosspin, said drive bushing and said drive gear against rotation with respect to the shank and the front end frame under the urging of said first spring means;
- an annular cam member slidable longitudinally on the outside of the shank, key means restraining said cam member and the shank against relative rotation with respect to one another, said cam member having a generally triangular cam slot therein with a longitudinally extending edge, a circumferentially extending edge extending substantially perpendicularly from the front end of said longitudinally extending edge, and a circumferentially and longitudinally inclined edge extending between the opposite ends of said longitudinally and circumferentially extending edges;
- a roller of said first radial end projection of said crosspin engaged in said cam slot;
- a mandrel in said counterbore adapted to be pushed rearwardly by a workpiece threaded by said rolls and compressing said second spring means to cause said first radial end projection of the crosspin to move rearwardly along said taper cam to gradually open said thread rolls to roll a taper thread on a workpiece, and then at said rearwardly facing surface to permit said first spring means to immediately rotate said drive bushing, said crosspin and said drive gear in said one rotational direction, with said roller on said crosspin riding across said circumferentially extending edge of the cam slot from said longitudinally extending edge over to said inclined edge to release said threading implement from a workpiece;
- and said cam member, when moved longitudinally in one direction, moving the inclined edge of the cam slot over said roller to turn the crosspin, said drive bushing and said drive gear in the opposite rotational direction against the urging of said first spring means until said first radial end projection of the crosspin registers with said taper cam surface, whereupon said second spring means forces said first radial end projection of the crosspin forwardly along said taper cam surface to reset said threading implement by locking said crosspin, said drive bushing and said drive gear against rotation relative to the shank and the frame.

References Cited
UNITED STATES PATENTS

| | | | |
|---|---|---|---|
| 2,720,801 | 10/1955 | Erdelyi | 72—100 |
| 2,909,087 | 10/1959 | Powell | 72—100 |
| 3,058,196 | 10/1962 | Bour | 72—78 |
| 3,149,511 | 9/1964 | Warren | 72—95 |
| 3,164,042 | 1/1965 | Hanna | 72—121 |
| 3,236,081 | 2/1966 | Kruse | 72—78 |

CHARLES W. LANHAM, *Primary Examiner.*

K. C. DECKER, *Assistant Examiner.*